(12) United States Patent
Suzuki et al.

(10) Patent No.: US 7,650,977 B2
(45) Date of Patent: Jan. 26, 2010

(54) FRICTION PLATE FOR WET-TYPE MULTI-PLATE CLUTCH

(75) Inventors: Hideaki Suzuki, Fukuroi (JP); Masahiro Kobayashi, Fukuroi (JP); Masaki Sakabe, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 432 days.

(21) Appl. No.: 11/486,126

(22) Filed: Jul. 14, 2006

(65) Prior Publication Data

US 2007/0017773 A1  Jan. 25, 2007

(30) Foreign Application Priority Data

Jul. 20, 2005 (JP) ............................. 2005-209883
Dec. 28, 2005 (JP) ............................. 2005-379087

(51) Int. Cl.
*F16D 13/64* (2006.01)
*F16D 13/74* (2006.01)

(52) U.S. Cl. ................................ 192/113.36; 192/70.12
(58) Field of Classification Search ............. 192/113.36
See application file for complete search history.

(56) References Cited

U.S. PATENT DOCUMENTS

| 3,094,194 A | * | 6/1963 | Kershner ................. 188/71.5 |
| 3,198,295 A | * | 8/1965 | Fangman et al. ......... 188/264 E |
| 5,101,953 A | * | 4/1992 | Payvar ................... 192/107 R |
| 6,283,265 B1 | * | 9/2001 | Hirayanagi et al. ...... 192/70.12 |
| 2005/0109576 A1 | * | 5/2005 | Kitahara et al. ........ 192/113.36 |

FOREIGN PATENT DOCUMENTS

JP     04136524 A  *  5/1992
JP     2005-76759 A    3/2005

* cited by examiner

*Primary Examiner*—Richard M. Lorence
(74) *Attorney, Agent, or Firm*—Miles & Stockbridge P.C.

(57) ABSTRACT

The present invention provides a friction plate for a wet-type multi-plate clutch, to which a wet-type friction material is secured and in which there are provided an oil passage communicated with inner and outer peripheral edges, an oil groove opened toward the inner peripheral edge and having a terminal end disposed between the inner peripheral edge and the outer peripheral edge, and at least one circumferential groove communicated with the oil passage and extending in a circumferential direction.

13 Claims, 5 Drawing Sheets

FRICTION PLATE FOR WET-TYPE MULTI-PLATE CLUTCH

BACKGROUND OF THE INVENTION

1. Field of the Invention

The present invention relates to a friction plate for a wet-type multi-plate clutch used as a brake or a clutch of an automatic transmission of a vehicle and the like.

2. Related Background Art

In a friction plate having good properties in which drag torque is reduced and the clinging in friction engagement at an initial stage during the friction engagement is prevented by providing an oil passage or an oil groove in a friction material of the friction plate, a technique in which an oil passage extending from an inner peripheral side to an outer peripheral side and a groove having a closed end and gradually narrowing from the inner peripheral side to the outer peripheral side are provided has been proposed, for example, as disclosed in Japanese Patent Application Laid-open No. 2005-76759.

In the Japanese Patent Application Laid-open No. 2005-76759, excessive lubricating oil which generates viscous resistance during an idle rotation is discharged via the oil passage, and a gap or clearance between friction surfaces is maintained properly by the groove having the closed end and gradually narrowing from the inner peripheral side to the outer peripheral side, thereby reducing idle rotation drag and initial clinging torque.

Although such a friction plate is excellent in the points that the drag torque during the idle rotation is reduced and that the initial clinging of the friction engagement is eliminated, in such a friction plate, there is variation in an oil discharging ability from the friction surfaces during the engagement depending upon the difference or variation in the porosity of the friction material so that there is variation in coefficient of friction of each friction plate at the initial engagement.

Oil pressure for urging the friction plates of the automatic transmission is tuned in order to achieve smooth speed change; however, if there is great variation in the oil discharging ability from the friction surfaces of the respective friction plates, it is difficult to adjust individually, which may cause transmission shock.

SUMMARY OF THE INVENTION

Accordingly, an object of the present invention is to provide a friction plate in which there is less variation in coefficient of friction during the engagement, thereby providing a wet-type multi-plate clutch capable of achieving smooth engagement.

To achieve the above object, the present invention provides a friction plate for a wet-type multi-plate clutch, to which a wet-type friction material is secured and in which there are provided an oil passage communicated with inner and outer peripheral edges, an oil groove opened toward the inner peripheral edge and having a terminal end disposed between the inner peripheral edge and the outer peripheral edge, and at least one circumferential groove communicated with the oil passage and extending in a circumferential direction.

According to the present invention, the following advantages can be obtained.

By providing the at least one circumferential groove communicated with the oil passage and extending in the circumferential direction, since an oil discharging ability is made uniform through the whole friction surface, variation in coefficient of friction at various surface pressure areas is reduced.

Further, similar to the prior arts, low drag torque is maintained properly during an idle rotation.

Initial clinging torque can be reduced to achieve smooth engagement.

If a friction material segment is used, by performing face-pressing of both circumferential ends of the segment, the drag can be reduced more effectively.

Since the wet-type friction material includes the oil passage communicated with the inner and outer peripheral edges, the oil groove opened toward the inner peripheral edge and having the terminal end disposed between the inner peripheral edge and the outer peripheral edge and the at least one circumferential groove communicated with the oil passage and extending in the circumferential direction, a friction plate in which drag torque during the idle rotation is small and which has a property having no initial clinging and in which there is less variation in coefficient of friction by making the oil discharging abilities from the friction surface during the engagement in the circumferential direction can be provided.

DESCRIPTION OF THE PREFERRED EMBODIMENTS

Figure 1:
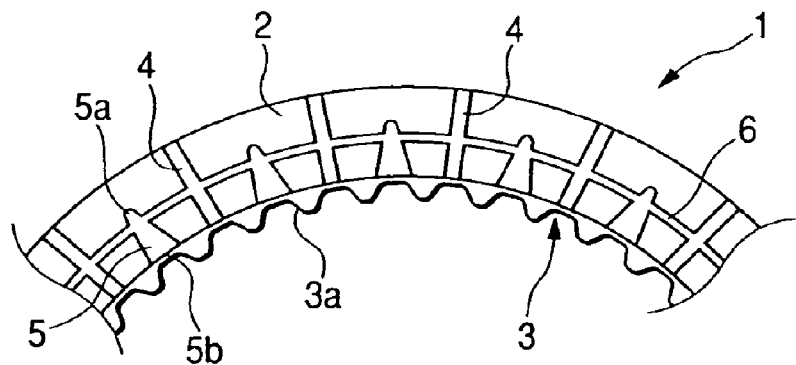
FIG. 1 is a partial front view of a friction plate according to a first embodiment of the present invention.

Now, various embodiments of the present invention will be fully explained with reference to the accompanying drawings. Incidentally, in the drawings, the same or similar elements will be designated by the same reference numerals. Further, it should be noted that the various embodiments are merely exemplary but do not limit the present invention in all senses.

First Embodiment

FIG. 1 is a partial front view of a friction plate 1 according to a first embodiment of the present invention. The friction plate 1 for a wet-type multi-plate clutch is constituted by securing a wet-type friction material 2 to a generally annular core plate 3 in a conventional manner. Splines 3a are formed in an inner periphery of the core plate 3 and a rotatable member (not shown) is fitted into the splines.

The wet-type friction material 2 includes oil passages 4 communicated with inner and outer peripheral edges of the friction material, oil grooves 5, each having an open end 5b opened toward the inner peripheral edge and a terminal end 5a disposed between the inner peripheral edge and the outer peripheral edge, an circumferential groove 6 communicated with the oil passages 4 and extending in a circumferential direction. The generally linear oil passages 4 and the plural tapered oil grooves 5 each having a circumferential width gradually narrowing toward the terminal end 5a are arranged along the circumferential direction alternately and equidistantly.

The annular circumferential groove 6 is joined to the oil passages 4 at middle points thereof and is communicated with the oil passages. Further, the circumferential groove 6 is joined to the oil grooves 5 near the terminal ends 5a thereof and is communicated with the oil grooves.

Second Embodiment

Figure 2:
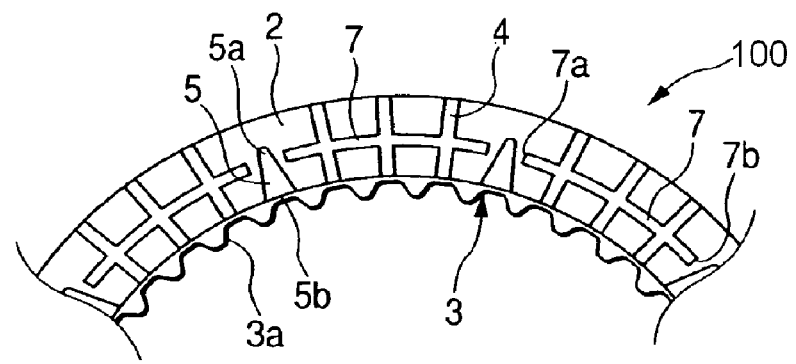
FIG. 2 is a partial front view of a friction plate according to a second embodiment of the present invention.

FIG. 2 is a partial front view of a friction plate 100 according to a second embodiment of the present invention. Since a fundamental construction of the second embodiment is similar to that of the first embodiment, only differences will be described. Similar to the first embodiment, oil grooves 5 are arranged along the circumferential direction substantially equidistantly. However, in the second embodiment, three oil passages 4 are equidistantly disposed between adjacent oil grooves 5.

In the second embodiment, a circumferential groove 7 is communicated with all of the oil grooves 4 but is not continuous in the circumferential direction so as not to be joined to and communicated with the oil grooves 5. As a result, plural oil grooves 5 are provided as independent grooves. Both circumferential ends 7a and 7b of each groove portion of the circumferential groove 7 are opposed to the oil grooves 5 with gaps therebetween.

Third Embodiment

Figure 3:
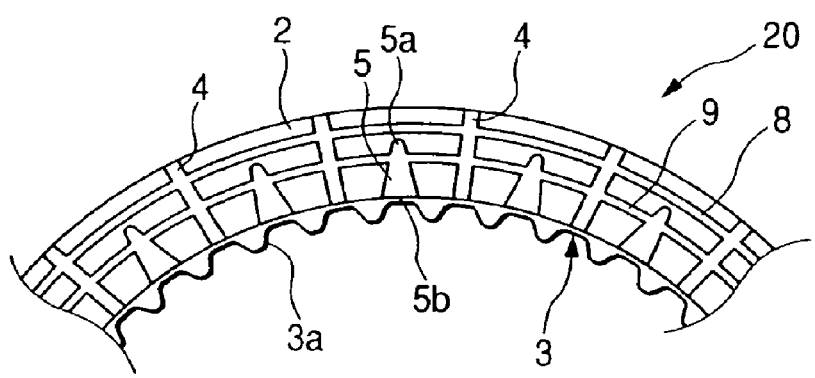
FIG. 3 is a partial front view of a friction plate according to a third embodiment of the present invention.

FIG. 3 is a partial front view of a friction plate 20 according to a third embodiment of the present invention. A fundamental construction of the third embodiment is similar to that of the first embodiment. However, a construction of a circumferential groove of the third embodiment differs from that of the first embodiment. In the first embodiment, the single circumferential groove is provided; whereas, in the third embodiment, two circumferential grooves 8 and 9 are provided.

The outer circumferential groove 8 is continuous in the circumferential direction and is communicated with all of the oil passages 4. But, the groove 8 is not jointed to the oil grooves 5 i.e. not communicated with the oil grooves 5. On the other hand, the inner circumferential groove 9 is continuous in the circumferential direction and is communicated with all of the oil passages 4 and oil grooves 5.

Fourth Embodiment

Figure 4:
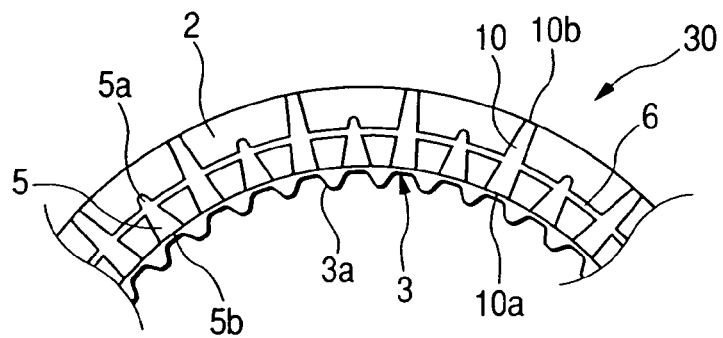
FIG. 4 is a partial front view of a friction plate according to a fourth embodiment of the present invention.

FIG. 4 is a partial front view of a friction plate 30 according to a fourth embodiment of the present invention. A fundamental construction of the fourth embodiment is similar to that of the first embodiment. However, a configuration of each oil passage 10 of the fourth embodiment differs from those of the first to third embodiments. In the first to third embodiments, each oil passage has a uniform width from the outer peripheral edge to the inner peripheral edge. However, in the fourth embodiment, each oil passage 10 has a tapered shape having a circumferential width gradually narrowing from an outer peripheral edge 10a to an inner peripheral edge 10b.

As can be seen from FIG. 4, in the fourth embodiment, both of oil grooves 5 and oil passages 10 have the tapered shapes having the circumferential widths gradually narrowing from the inner peripheral edge toward the outer peripheral edge. Thus, for example, lubricating oil supplied from an inner diameter side of a wet-type multi-plate clutch incorporating friction plates therein is apt to be flown into the circumferential groove 6, with the result that the oil discharging ability can be made more uniform throughout the whole friction surface, thereby reducing variation in coefficient of friction in various surface pressure areas.

Fifth Embodiment

Figure 5:
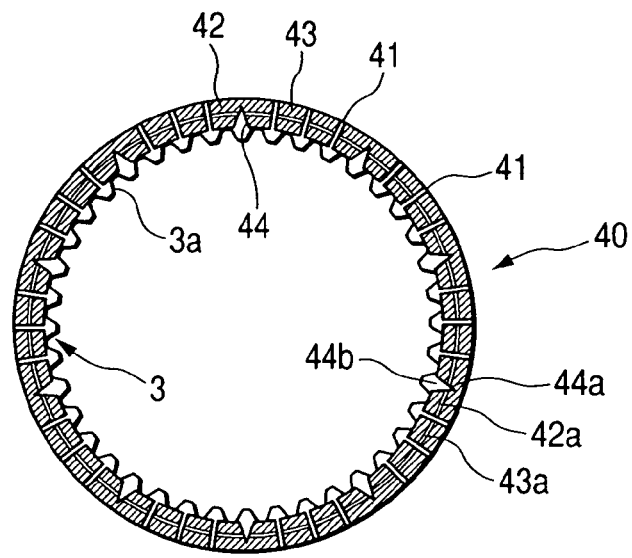
FIG. 5 is a front view of a friction plate according to a fifth embodiment of the present invention.

FIG. 5 is a front view of a friction plate according to a fifth embodiment of the present invention. In this embodiment, a friction plate 40 is constituted by sticking a plurality of friction material segments to a core plate 3 in line with each other along a circumferential direction.

Two second friction material segments 43 each having a circumferential width smaller than that of a first friction material segment 42 are arranged between the first friction material segments 42. These segments are disposed on the core plate 3 along the circumferential direction. An oil passage 41 communicated with both of inner and outer peripheral edges is formed between the first friction material segment 42 and is also formed between the adjacent second friction material segments 43. The surface of the core plate 3 is exposed through these oil passages 41. The oil passages 41 have substantially same circumferential widths.

Circumferential grooves 42a and 43a extending in the circumferential direction are formed in the first and second friction material segments 42 and 43, respectively. The circumferential grooves 42a and 43a are disposed at middle points of the friction material segments in a radial direction and are substantially aligned with each other in the circumferential direction. Accordingly, as shown in FIG. 5, regarding the whole friction plate 40, the circumferential grooves 42a and 43a can be regarded as a single circumferential groove discontinued by the oil passages 41.

An oil groove 44 opened toward the inner peripheral edge of the friction plate 40 and having a terminal end 44a disposed between the inner and outer peripheral edges is provided in each first friction material segment 42. The oil groove 44 is communicated with the circumferential groove 42a in the vicinity of the terminal end 44a.

The oil groove 44 has a tapered shape gradually narrowing from an open end 44b opened toward the inner peripheral edge to the terminal end 44a. The open end 44b has a circumferential width greater than that of the terminal end 44a and is disposed at a substantially central portion of the first friction material segment 42 in the circumferential direction.

Sixth Embodiment

Figure 6:
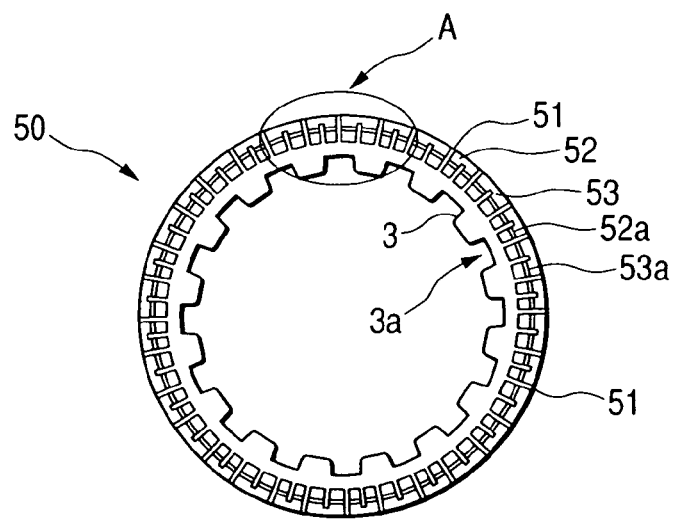
FIG. 6 is a front view of a friction plate according to a sixth embodiment of the present invention.
Figure 7:
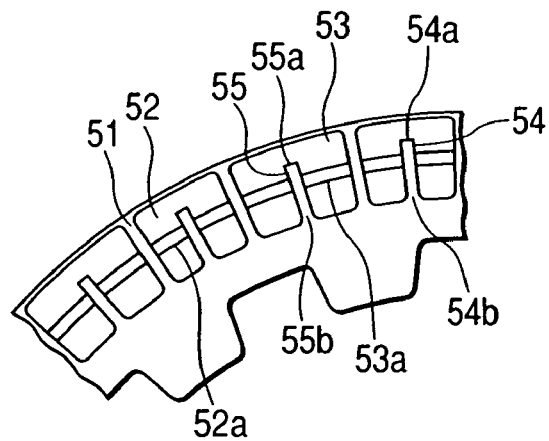
FIG. 7 is an enlarged view of an area A in FIG. 6.

FIG. 6 is a front view of a friction plate according to a sixth embodiment of the present invention and FIG. 7 is an enlarged view of an area A in FIG. 6. Similar to the fifth embodiment, in the sixth embodiment, a friction plate 50 is constituted by sticking a plurality of friction material segments to a core plate 3 in line with each other along a circumferential direction.

First friction material segments 52 and second friction material segments 53 each having a circumferential width greater than that of the first friction material segment 52 are arranged alternately along the circumferential direction. An oil passage 51 communicated with both of inner and outer peripheral edges is formed between each first friction material segment 52 and each second friction material segment 53. A surface of the core plate 3 is exposed through the oil passages 51. The oil passages 51 have substantially same circumferential widths.

Circumferential grooves 52a and 53a extending in the circumferential direction are formed in the first and second friction material segments 52 and 53, respectively. The circumferential grooves 52a and 53a are disposed at middle points of the friction material segments in a radial direction and are substantially aligned with each other in the circumferential direction. Accordingly, as shown in FIGS. 6 and 7, regarding the whole friction plate 50, the circumferential grooves 52a and 53a can be regarded as a single circumferential groove discontinued by the oil passages 51. The circumferential grooves are formed, for example, by performing the press-urging after the friction material segments are stuck.

Further, an oil groove 55 having an open end 54b opened to the inner peripheral edge of the friction plate 50 and a terminal end 54a disposed between the inner and outer peripheral edges is formed at a substantially central portion of the first friction material segment 52 in the circumferential direction. The oil groove 54 is communicated with the corresponding circumferential groove 52a. Further, the oil groove 54 is formed as a rectangular groove having a substantially uniform circumferential width extending from the terminal end 54a to the open end 54b.

An oil groove 55 having an open end 55b opened to the inner peripheral edge of the friction plate 50 and a terminal end 55a disposed between the inner and outer peripheral edges is formed at a substantially central portion of the second friction material segment 53 in the circumferential direction. The oil groove 55 is communicated with the corresponding circumferential groove 53a. Further, the oil groove 55 is formed as a rectangular groove having a substantially uniform circumferential width extending from the terminal end 55a to the open end 55b.

Incidentally, while an example that two kinds of friction material segments having different circumferential widths i.e. first friction material segments 52 and second friction material segments 53 are arranged in the annular pattern was explained, two or more kinds of friction material segments having different sizes may be arranged in a different pattern. Further, friction segments having the same sizes i.e. one kind of friction material segments alone may be arranged.

Seventh Embodiment

Figure 8:
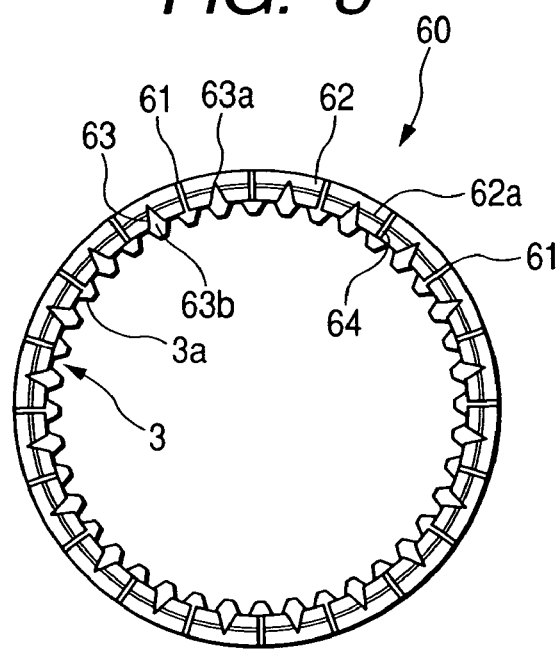
FIG. 8 is a front view of a friction plate according to a seventh embodiment of the present invention.
Figure 9:
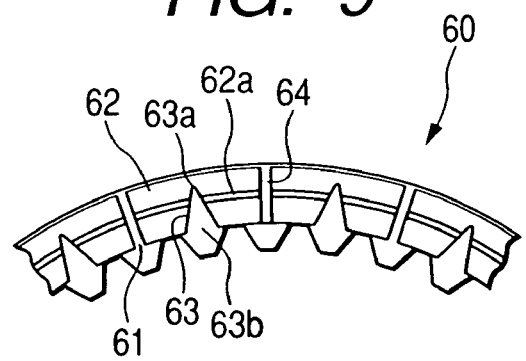
FIG. 9 is a partial enlarged view of FIG. 8.

FIG. 8 is a front view of a friction plate according to a seventh embodiment of the present invention and FIG. 9 is a partial enlarged view of FIG. 8. Similar to the fifth and sixth embodiments, a friction plate 60 is constituted by sticking a plurality of friction material segments to a core plate 3 in line with each other along a circumferential direction.

In this embodiment, a plurality of friction material segments 62 having same shapes are arranged along a circumferential direction. An oil passage 61 communicated with both of inner and outer peripheral edges is formed between the respective friction material segments 62. A surface of the core plate 3 is exposed through the oil passages 61. Further, the oil passages 61 have same circumferential widths.

A circumferential groove 62a extending in the circumferential direction is formed in each friction material segment 62. As shown in FIG. 8, regarding the whole friction plate 60, the circumferential grooves 62a can be regarded as a single groove discontinued by the oil passages 61.

As shown in FIG. 9 in detail, two oil grooves 63 each opened to the inner peripheral edge of the friction plate 60 and each having a terminal end 63a disposed between the inner and outer peripheral edges are provided in each friction material segment 62. The oil grooves 63 are communicated with the circumferential groove 63a in the vicinity of the terminal ends 63a thereof.

Each oil groove 63 has a tapered shape extending from an open end 63b opened to the inner peripheral edge to the terminal end 63a. The open end 63b has a circumferential width greater than that of the terminal end 63a and two open ends are provided in the friction material segment 62 along the circumferential direction.

A second oil passage 64 communicated with both of the inner and outer peripheral edges is formed at a substantially central portion of the friction material segment 62. The oil passage 64 has a substantially uniform circumferential width extending from the inner peripheral edge to the outer peripheral edge. As can be seen from FIG. 9, the second oil passage 64 is positioned at a substantially middle point between two oil grooves 63.

The second oil passage 64 is formed in the friction material segment 62 by cutting or deformation processing. Further, the second oil passage 64 is communicated with the circumferential groove 62a at a substantially middle point in a radial direction.

Eighth Embodiment

Figure 10:
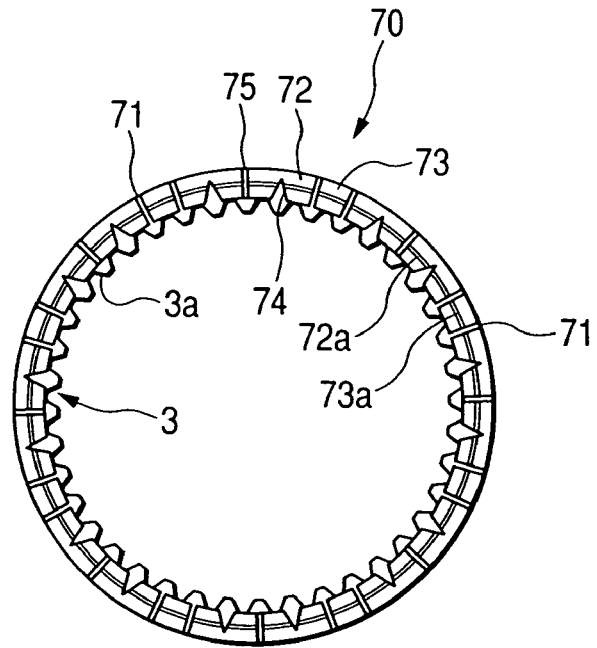
FIG. 10 is a front view of a friction plate according to an eighth embodiment of the present invention.
Figure 11:
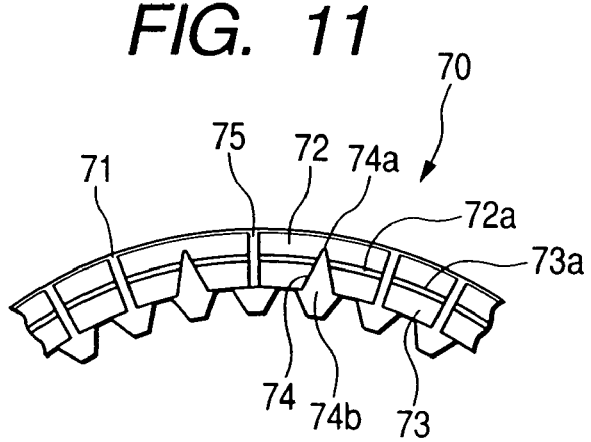
FIG. 11 is a partial enlarged view of FIG. 10.

FIG. 10 is a front view of a friction plate according to an eighth embodiment of the present invention and FIG. 11 is a partial enlarged view of FIG. 10. Similar to the fifth to seventh embodiments, in the eighth embodiment, a friction plate 70 is constituted by sticking a plurality of friction material segments to a core plate 3 in line with each other along a circumferential direction.

First friction material segments 72 and second friction material segments 73 each having a circumferential width smaller than that of the first friction material segment 72 are arranged alternately along the circumferential direction. An oil passage 71 communicated with both of inner and outer peripheral edges is formed between each first friction material segment 72 and each second friction material segment 73. A surface of the core plate 3 is exposed through the oil passages 71. The oil passages 51 have substantially same circumferential widths.

Circumferential grooves 72a and 73a extending in the circumferential direction are formed in the first and second friction material segments 72 and 73, respectively. The circumferential grooves 72a and 73a are disposed at middle points of the friction material segments in a radial direction and are substantially aligned with each other in the circumferential direction. Accordingly, as shown in FIGS. 10 and 11, regarding the whole friction plate 70, the circumferential grooves 72a and 73a can be regarded as a single circumferential groove discontinued by the oil passages 71.

As shown in FIG. 11 in detail, two oil grooves 74 each opened to the inner peripheral edge of the friction plate 7 and each having a terminal end 74a disposed between the inner and outer peripheral edges are provided in each first friction material segment 72. The oil grooves 74 are communicated with the circumferential groove 72a in the vicinity of the terminal ends 74a thereof.

Each oil groove 74 has a tapered shape extending from an open end 74b opened to the inner peripheral edge to the terminal end 74a. The open end 74b has a circumferential width greater than that of the terminal end 74a and two open ends are provided in the first friction material segment 72 along the circumferential direction.

A second oil passage 75 communicated with both of the inner and outer peripheral edges is formed at a substantially central portion of the first friction material segment 72. The oil passage 75 has a substantially uniform circumferential width extending from the inner peripheral edge to the outer peripheral edge. As can be seen from FIG. 11, the second oil passage 75 is positioned at a substantially middle point between two oil grooves 74.

The second oil passage 75 is formed in the first friction material segment 72 by cutting or deformation processing. Further, the second oil passage 75 is communicated with the circumferential groove 72a at a substantially middle point in a radial direction.

Figure 12:
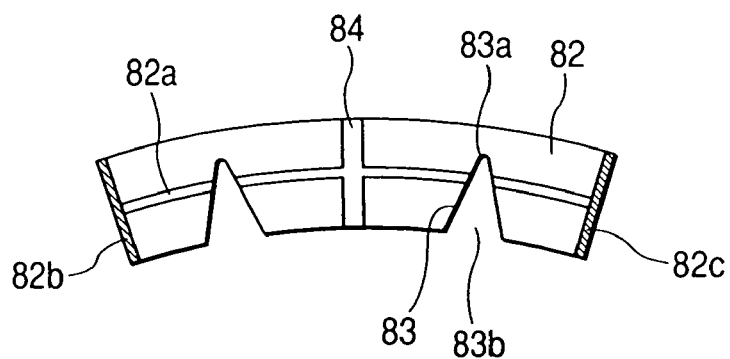
FIG. 12 is a front view showing a friction material segment which is applicable to the fifth to eighth embodiments and which is face-pressed at both circumferential ends thereof.

FIG. 12 is a front view showing a friction material segment which is applicable to the fifth to eighth embodiments and which is face-pressed at both circumferential ends thereof. Similar to the above embodiments, a friction material segment 82 is provided with oil grooves 83 each having a tapered shape extending from an open end 83 opened to an inner peripheral edge to a terminal end 83a. The open end 83b has a circumferential width greater than that of the terminal end 83a and two open ends are provided in the friction material segment 82 along a circumferential direction.

An oil passage 84 communicated with both of inner and outer peripheral edges is formed at a substantially central portion of the friction material segment 82 in the circumferential direction. The oil passage 84 has a substantially uniform circumferential width extending from the inner peripheral edge to the outer peripheral edge. As can be seen from FIG. 12, the oil passage 84 is positioned at a substantially middle point between two oil grooves 83.

Further, a circumferential groove 82a extending in the circumferential direction is provided in the friction material segment 82. The circumferential groove 82a is disposed at a middle point of the friction material segment in a radial direction and is communicated with the oil passage 84.

Here, as shown, both circumferential ends 82b and 82c of the friction material segment 82 are face-pressed. By performing the face-pressing, drag torque can be reduced more effectively.

In the above-mentioned first to fourth embodiments, inner peripheral ends of the oil passages 4 and the oil grooves 5 are opposed to valleys of the splines of the core plate 3. Further, the various embodiments can be combined. For example, in the second and third embodiments, two circumferential grooves may be provided. Further, three or more circumferential grooves may be provided.

In order to manufacture a friction plate having the above-mentioned oil passages, oil grooves and circumferential groove(s), various grooves are previously formed in the friction material 2 by press punching, and the friction material is secured to the core plate 3 by an adhesive or the like. Alternatively, after the friction material 2 is secured to the core plate 3, various grooves may be formed in the friction material 2 by pressing.

Further, in the fifth to eighth embodiments, each of the circumferential grooves is a groove opened to at least one circumferential end face of the friction material segment. However, the circumferential groove may be formed as a groove obtained by cutting or the like.

Figure 13:
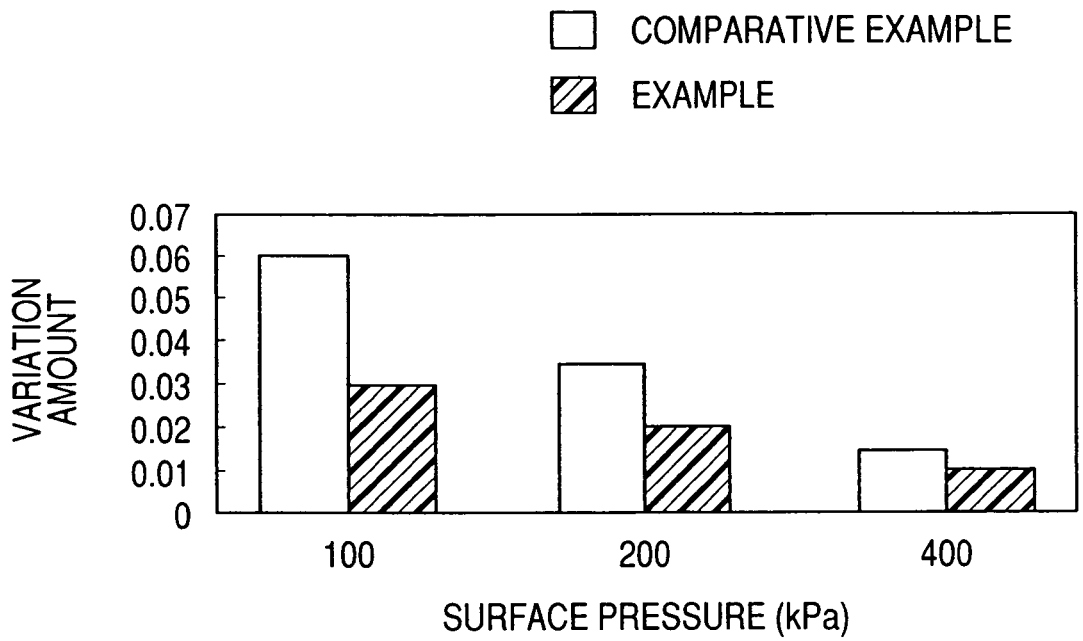
FIG. 13 is a graph showing comparison between variation of initial coefficient of friction in the first embodiment of the present invention and that in a comparative example.

FIG. 13 is a graph showing test results for comparing variation in initial coefficient of friction between the first embodiment and a comparative example. The comparing tests were performed under the following conditions:

| | |
|---|---|
| rotation number | 3600 rpm |
| inertia mass | 0.20 kg · m$^2$ |
| surface pressure | 100, 200, 400 KPa |
| oil temperature | about 400° C. |
| flow rate | 0.7 l/min |
| number of oil passages | 25 |
| number of oil grooves | 25 |
| number of circumferential grooves | 1 |

According to FIG. 13, in the first embodiment of the present invention, it can be seen that the variation is reduced at any of surface pressures. In particular, when the surface pressure during the initial engagement, for example, when the surface pressure is 100 KPa, the variation in initial coefficient of friction is reduced to about a half of the variation in the comparative example.

Figure 14:
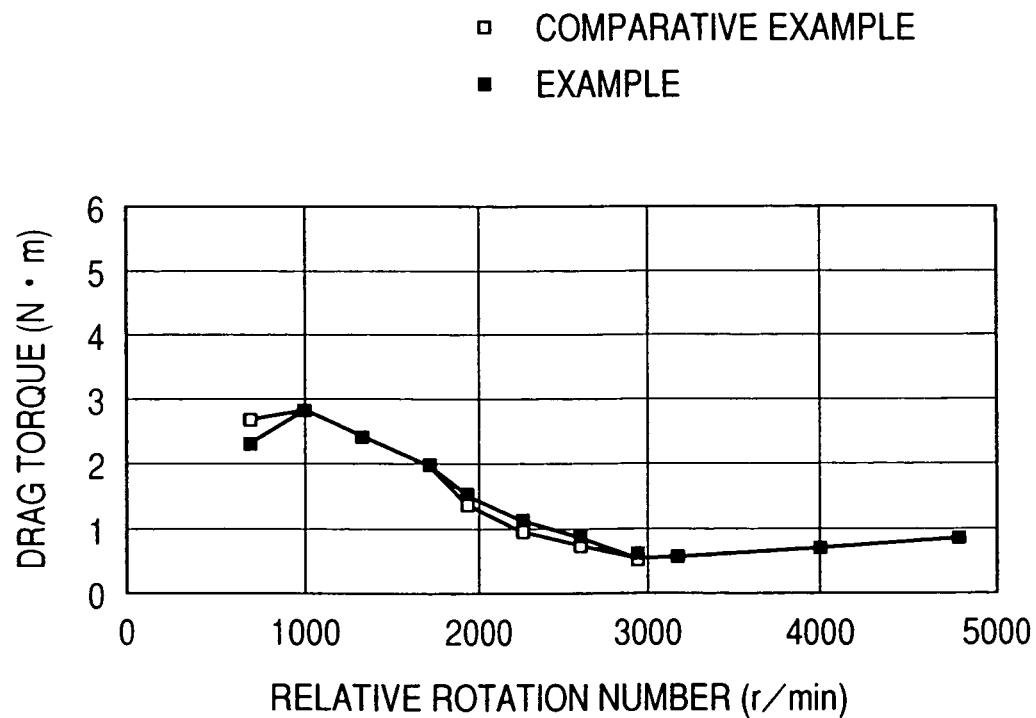
FIG. 14 is a graph showing comparison between idle rotation drag torque in the first embodiment and that in a comparative example at various rotation numbers.

FIG. 14 is a graph showing comparison between idle rotation drag torque in the first embodiment of the present invention and that in a comparative example, at various rotation numbers. The comparison was performed under the following conditions: oil temperature of about 80° C. and flow rate of 0.3 l/min.

As apparent from FIG. 14, there is almost no difference in idle rotation drag torque between the comparative example as a conventional example and the first embodiment; thus, also in the friction plate of the present invention, the idle rotation drag torque is maintained to a low value, similar to the conventional case. Incidentally, it was found that the result is similar even when the number of circumferential groove is increased.

In each of the comparative examples shown in FIGS. 13 and 14, the friction plate described in "Related Background Art" in this specification was used. Further, also in the second to eighth embodiments, since the substantially the same results as the first embodiment can be obtained, it should be noted that the test results shown in FIGS. 13 and 14 can also be applied to the second to eighth embodiments.

This application claims priority from Japanese Patent Application Nos. 2005-209883 filed on Jul. 20, 2005 and 2005-379087 filed on Dec. 28, 2005, which are hereby incorporated by reference herein.

What is claimed is:

1. A friction plate for a wet-type multi-plate clutch, comprising:
 wet-type friction material secured to an annular plate, the friction material having:
 oil passages extending from an inner peripheral edge to an outer peripheral edge of the friction material;
 oil grooves being open at said inner peripheral edge and each having a terminal end disposed between said inner peripheral edge and said outer peripheral edge; and
 at least one circumferential groove extending in a circumferential direction of the annular plate and connecting at least some of the oil passages,
 wherein the oil passages and the oil grooves are alternately arranged, and each of said oil passages is spaced from an adjacent oil passage at a distance in the circumferential direction which is equal to a distance in the circumferential direction at which each of said oil grooves is spaced from an adjacent oil groove.

2. A friction plate for a wet-type multi-plate clutch according to claim 1, wherein the at least one circumferential groove intersects at least some of the oil grooves.

3. A friction plate for a wet-type multi-plate clutch according to claim 1, wherein a circumferential width of each oil passage is gradually narrowed from said inner peripheral edge to said outer peripheral edge.

4. A friction plate for a wet-type multi-plate clutch according to claim 1, wherein a circumferential width of each oil groove is gradually narrowed from said inner peripheral edge to the terminal end thereof.

5. A friction plate for a wet-type multi-plate clutch according to claim 1, wherein each oil groove has a circumferential width which is substantially uniform from said inner peripheral edge to the terminal end thereof.

6. A friction plate for a wet-type multi-plate clutch according to claim 1, wherein said wet-type friction material comprises a plurality of friction material segments disposed along the circumferential direction and each oil groove is a groove formed by cutting.

7. A friction plate for a wet-type multi-plate clutch according to claim 6, wherein a plurality of said oil grooves are provided in at least one of said friction material segments, and a said passage extending from said inner peripheral edge to said outer peripheral edge is formed between said oil grooves.

8. A friction plate for a wet-type multi-plate clutch according to claim 7, wherein both circumferential ends of each of said friction material segments are face-pressed.

9. A friction plate for a wet-type multi-plate clutch according to claim 6, wherein the at least one circumferential groove is formed by pressing, after said friction material segments are secured to the annular plate.

10. A friction plate for a wet-type multi-plate clutch according to claim 1, wherein each oil groove is disposed midway in the circumferential direction between adjacent oil passages.

11. A friction plate for a wet-type multi-plate clutch according to claim 1, wherein each oil passage extends in a radial direction of the annular plate from said inner peripheral edge to said outer peripheral edge.

12. A friction plate for a wet-type multi-plate clutch according to claim 1, wherein each of the oil passages and the oil grooves is aligned in the circumferential direction with a valley between adjacent splines of the annular plate.

13. A friction plate for a wet-type multi-plate clutch according to claim 1, wherein a total number of the oil grooves and the oil passages is equal to a total number of splines of the annular plate.

* * * * *